United States Patent
Masri et al.

(10) Patent No.: US 6,594,344 B2
(45) Date of Patent: Jul. 15, 2003

(54) AUTO LATENCY TEST TOOL

(75) Inventors: Ahmad Masri, Nahis Village (IL); Steven J. Wilson, Kinnelon, NJ (US); Nir Nice, Kfar Veradim (IL)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 09/749,610

(22) Filed: Dec. 28, 2000

(65) Prior Publication Data

US 2002/0085683 A1 Jul. 4, 2002

(51) Int. Cl.[7] ............................................. H04M 1/24
(52) U.S. Cl. .................. 379/27.01; 379/27.02; 379/27.03; 379/27.04; 379/10.02; 379/22.02
(58) Field of Search ........................ 379/10.01, 10.02, 379/10.03, 27.01–27.08, 22.02

(56) References Cited

U.S. PATENT DOCUMENTS

| | | | | |
|---|---|---|---|---|
| 5,375,228 A | * | 12/1994 | Leary et al. | 714/33 |
| 5,572,570 A | * | 11/1996 | Kuenzig | 379/1.02 |
| 6,091,802 A | * | 7/2000 | Smith et al. | 379/1.03 |
| 6,411,679 B1 | * | 6/2002 | Khasnabish | 379/9 |

OTHER PUBLICATIONS www.hammer.com/p_IPTel_Article.htm, "Internet Telephony," 1998 Hammer Technologies, pp. 1–3.

* cited by examiner

*Primary Examiner*—Binh Tieu
*Assistant Examiner*—Barry W Taylor
(74) *Attorney, Agent, or Firm*—Pillsbury Winthrop LLP

(57) ABSTRACT

A system and method for measuring latency in voice communications is presented. In an exemplary embodiment, latency is measured by establishing a call between a first and a second telephony device, and measuring a latency between a signal originating at the first telephony device and the signal as it arrives at the second telephony device.

13 Claims, 5 Drawing Sheets

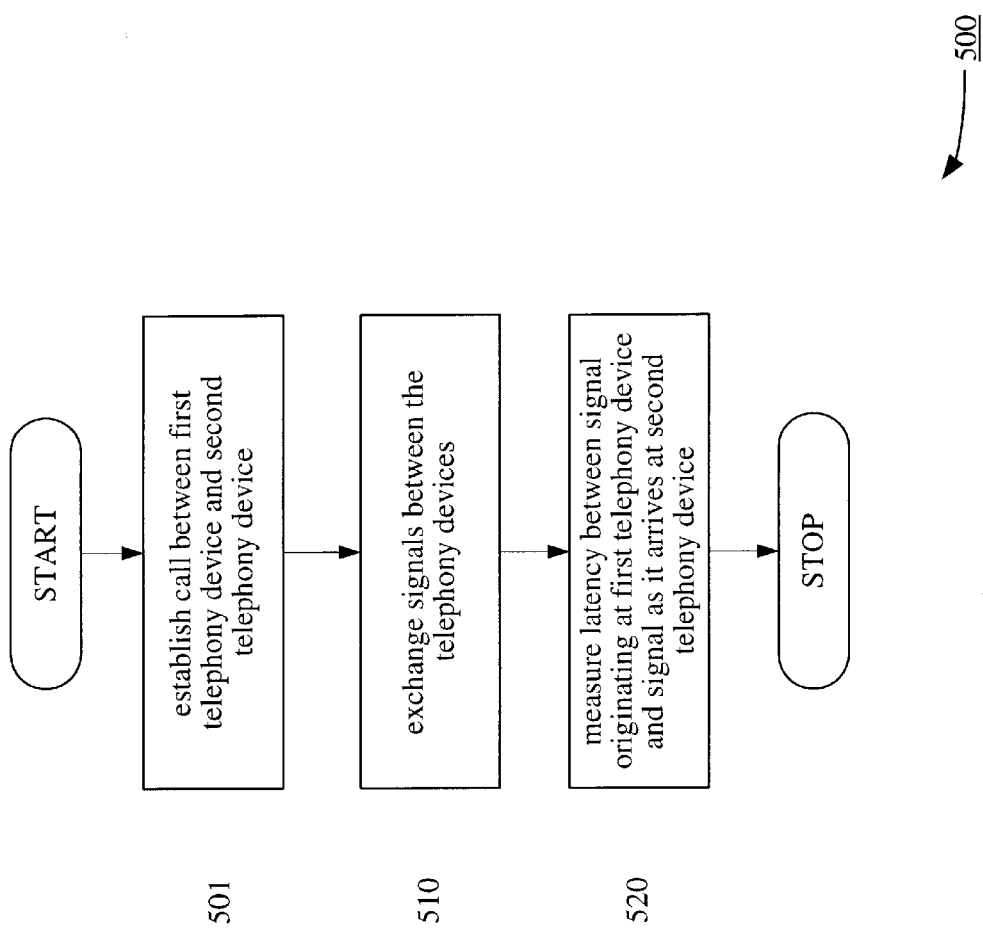

AUTO LATENCY TEST TOOL

BACKGROUND OF THE INVENTION

1. Field of the Invention

This invention generally relates to voice communications. More specifically, aspects of the invention relate to voice communications over a network.

2. Description of Background Information

Voice communications systems enable at least two people who are not face-to-face to communicate as if they were. Latency, or delay, is an important consideration in the design and evaluation of such systems.

Because voice communications systems seek to emulate face-to-face communication, latency between a voice signal originating at the first person and the signal as it arrives at the second person must be kept to a minimum. When latency is below 100 milliseconds (ms), for instance, most people do not notice a delay when conversing with another person. Between approximately 100 ms and 300 ms, however, most people perceive a slight hesitation in the other person's response. Above 300 ms, most people are very aware of the delay, and effective communication is inhibited. When a voice communications system becomes loaded with multiple connections, latency values may increase.

Voice communications are increasingly being realized over networks. For instance, VoIP (Voice over Internet Protocol) involves sending voice information in digital form in "packets" using the Internet Protocol. A number of factors contribute to latency in VoIP networks, including delays inherent in the physical transmission media, compression and decompression delays, and routing and other such network delays.

An attempt to measure latency due to compression and decompression in a VoIP network has been made in the art. DTMF tones are played and time-stamped by software at an originating channel, and the tones are time-stamped by software at a receiving channel following compression and decompression phases. The difference between the time stamps is designated as the latency.

However, when designing and evaluating voice communications systems, engineers require more exacting latency measurements than those afforded by software methodologies.

Therefore, what is needed is a system and method that accurately measures latency in voice communications systems.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 5 depicts a high-level flow diagram of a method according to an embodiment of the present invention.

DETAILED DESCRIPTION

A system and method for measuring latency, as described herein, involves establishing a call between a first and a second telephony device, and measuring a latency between a signal originating at the first telephony device and the signal as it arrives at the second telephony device. The telephony devices are connected to a data bus in a computer. The telephony devices transmit signals to each other and receive signals from each other. A monitoring device is also connected to the data bus and monitors calls between the telephony devices. The system further includes an oscilloscope having a first and a second probe connected to the monitoring device. The first probe senses a signal originating at the first telephony device, and the second probe senses the signal as it arrives at the second telephony device. A call generator connected to the telephony devices establishes calls between the telephony devices.

Figure 1:
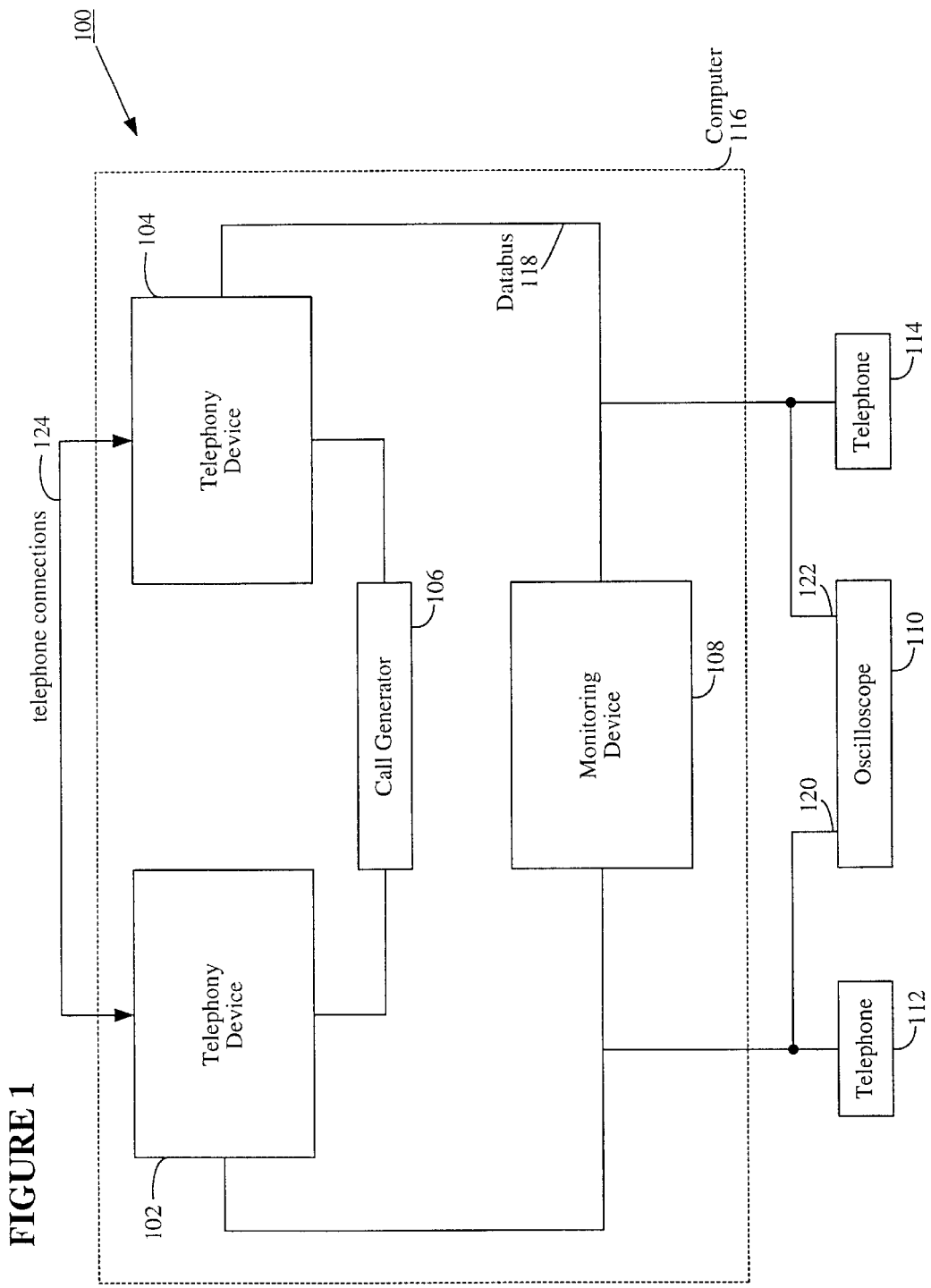
FIG. 1 depicts a high-level diagram of a system including one computer in accordance with an embodiment of the present invention.

FIG. 1 depicts system 100 in accordance with a first embodiment of the invention. As shown, system 100 comprises computer 116 and oscilloscope 110. In addition, system 100 may include telephones 112 and 114. Computer 116 comprises telephony devices 102 and 104 that are each connected to data bus 118 of computer 116. Call generator 106 is connected to telephony devices 102 and 104. Monitoring device 108 is connected to telephony devices 102 and 104 and to data bus 118. Oscilloscope 110 comprises probes 120 and 122, which are connected to telephones 112 and 114.

Telephony device 102 is directly connected to telephony device 104 via telephone connection or connections 124. Telephony devices 102 and 104 may send to each other, and receive from each other, telephone signals. Telephony devices 102 and 104 may also exchange signals with other remote telephony devices (not shown) connected to telephony devices 102 and 104. In system 100, telephony devices 102 and 104 may be implemented as analog telephony cards or digital telephony cards. A telephony card that supports the bus architecture of computer 116, the sharing of resources, and the transmission of telephone signals may be used. Telephony devices 102 and 104 may support one channel or multiple channels such that a number of concurrent calls may be routed between telephony devices 102 and 104. As such, system 100 may be loaded with multiple calls and varying voice traffic.

Dialogic Corporation, for instance, manufactures the D/240T1 and D/300E1 voice processing boards, which are PCI telephony cards that respectively support twenty-four voice channels and thirty voice channels. Therefore, in system 100, if two D/300E1 telephony cards are used, thirty concurrent calls may be established by call generator 106. In such an embodiment, multiple telephone connections 124 connect telephony devices 102 and 104.

Call generator 106 establishes one or more full duplex calls between telephony devices 102 and 104. Call generator 106 may be implemented as software or hardware. For example, call generator 106 may be realized as a bulk call generator program. Bulk call generator programs are well known in the art and generate traffic over telephone connections by establishing calls between various telephony devices. For example, a bulk call generator program may be written in Microsoft C++ to run on the Windows NT platform. Of course, other programming languages and platforms may be employed so long as compatibility between the components of system 100 exists.

Figure 2:
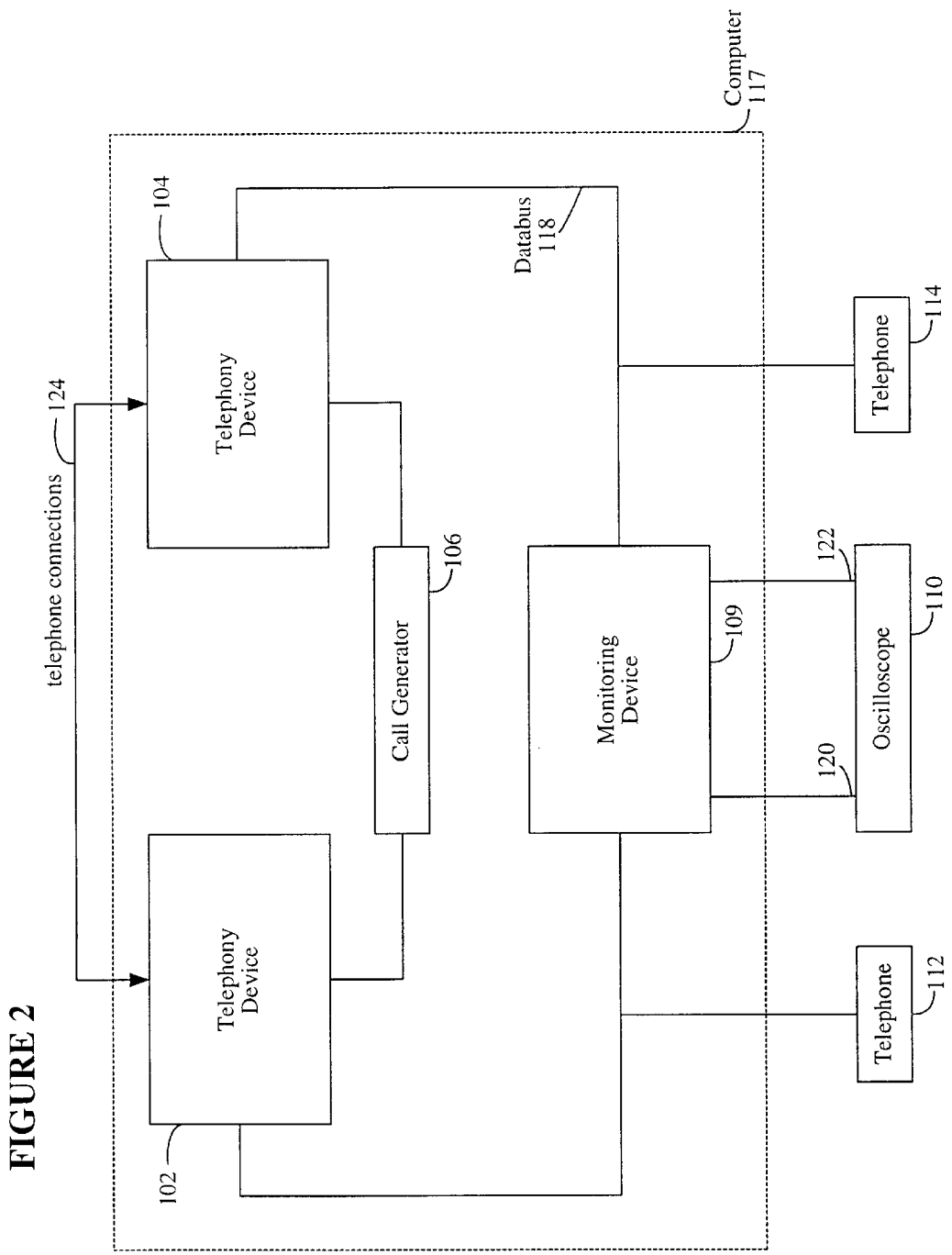
FIG. 2 depicts a high-level diagram of a system including one computer in accordance with an embodiment of the present invention.

Monitoring device 108 selectively monitors individual calls between telephony devices 102 and 104. Any monitoring device compatible with telephony devices 102 and 104 and data bus 118 may be implemented in system 100. For instance, Dialogic Corporation manufactures the D/41H High Performance 4-Port Voice Processing Board, which may selectively monitor four voice channels. Call generator 106 may be configured to control monitoring device 108 such that a test engineer may selectively monitor calls between telephony devices 102 and 104. A monitoring device 109 may be configured such that oscilloscope probes 120 and 122 are connected directly to monitoring device 109, as shown in FIG. 2.

As shown in FIG. 1, probe 120 of oscilloscope 110 is connected to telephone 112 such that probe 120 senses signals associated with telephony device 102. Probe 122 is connected to telephone 114 such that probe 122 senses signals associated with telephony device 104. Accordingly, when a telephone signal is established at telephony device 102, probe 120 senses the signal. After the telephone signal travels across telephone connection 124 to telephony device 104, probe 122 senses the received signal. Via oscilloscope 110, the phase difference between the originating signal and the received signal may be accurately measured. The phase difference between the signals represents the latency value.

Telephones 112 and 114 may be connected via RJ-11 connections to monitoring device 108. In addition, telephones 112 and 114 each may include a handset (not shown) that may be lifted during testing to enable a test engineer to confirm that calls are indeed being established between telephony devices 102 and 104. However, it is not essential that system 100 comprise telephones 112 and 114 when telephony devices 102 and 104 include telephonic circuitry which sends and receives telephone signals, and when telephony devices 102 and 104 or monitoring device 109 (see FIG. 2) are configured such that oscilloscope probes 120 and 122 may be directly attached thereto.

Various tones, such as DTMF tones, or recorded sounds, such as spoken words or conversations, may be transmitted between telephony devices 102 and 104. Such test signals may be recorded and stored in nonvolatile memory of computer 116 for use by call generator 106 in accordance with methods well known in the art.

In system 100, one call may be established between telephony devices 102 and 104, and the latency associated therewith may be measured with oscilloscope 110 and recorded. Using this latency value as a baseline, the effects of increased voice traffic on latency may be isolated and analyzed. More specifically, call generator 106 may establish additional calls to increase loading on system 100. The latency associated with such increased voice traffic may be measured via oscilloscope 110, and compared to the latency value associated with one call.

Figure 3:
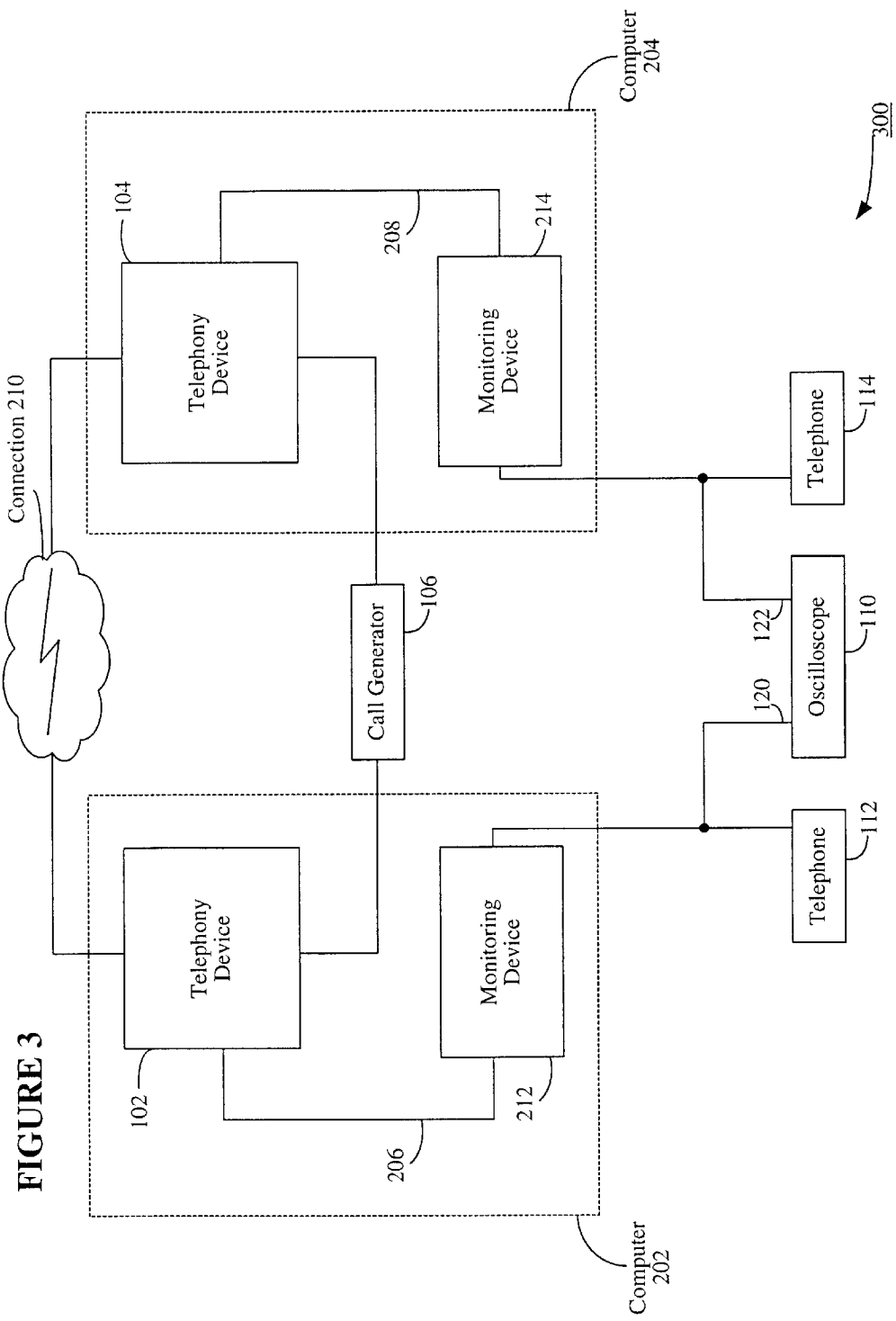
FIG. 3 depicts a high-level diagram of a system including two computers.

FIG. 3 shows another embodiment of the present invention. In system 300, computers 202 and 204 respectively comprise telephony devices 102 and 104, data buses 206 and 208, and monitoring devices 212 and 214. Telephony devices 102 and 104 exchange telephone signals with each other over network connection 210. Network connection 210 may comprise an Integrated Services Digital Network (ISDN) network, an internet, or the like. An ISDN network integrates analog or voice data with digital data over the same network. An internet is a system of computer networks. Call generator 106 is connected to telephony devices 102 and 104 and may be implemented as described above. Telephony devices 102 and 104 each have a monitoring device associated therewith. In particular, telephony device 102 is connected to monitoring device 212, and telephony device 104 is connected to monitoring device 214.

Oscilloscope 110 comprises probes 120 and 122, which are connected to monitoring devices 212 and 214. Oscilloscope 110 measures latency between a signal originating at telephony device 102 and the signal as it arrives at telephony device 104. Telephones 112 and 114 may be respectively connected to monitoring devices 212 and 214 of computers 202 and 204. Telephones 112 and 114 may comprise a handset (not shown) which may be lifted to monitor calls between telephony devices 102 and 104.

Figure 4:
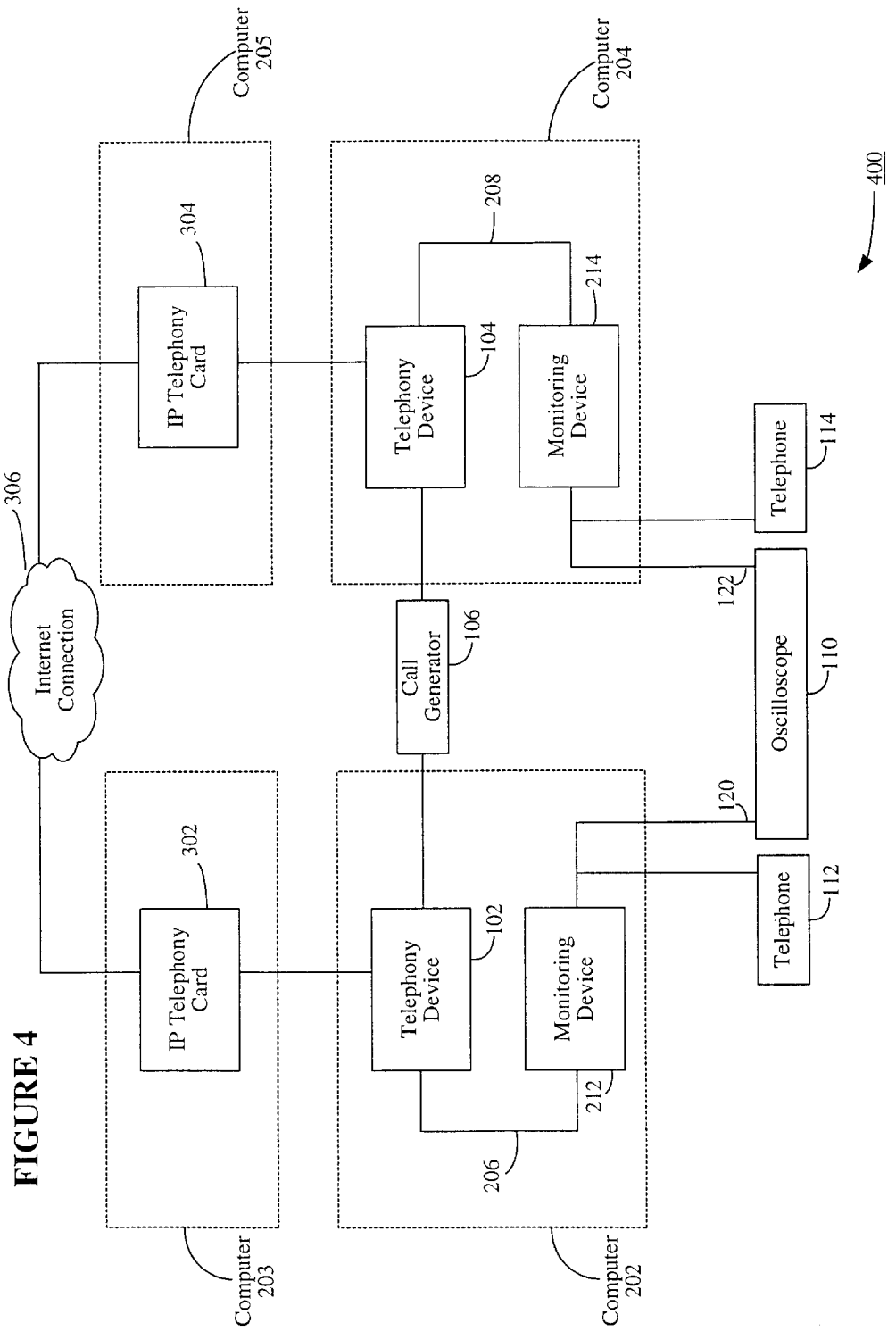
FIG. 4 depicts a high-level diagram of a system including two computers in a Voice over Internet Protocol environment.

System 400 of FIG. 4 is similar to system 300 of FIG. 3, but illustrates an embodiment that is specifically constructed and operative in a Voice over IP (VoIP) environment. As shown, computer 202 comprises telephony device 102 and monitoring device 212. Computer 202 includes data bus 206 to which telephony device 102 and monitoring device 212 are connected. Similarly, computer 204 comprises telephony device 104 and monitoring device 214. Computer 204 includes data bus 208 to which telephony device 104 and monitoring device 214 are connected.

Computer 203 comprises IP telephony card 302, which is connected to telephony device 102 of computer 202. Similarly, computer 205 comprises IP telephony card 304, which is connected to telephony device 104 of computer 204. In some embodiments, computers 202 and 203 may be the same computer, and computers 204 and 205 may be the same computer.

IP telephony card 302 is connected to IP telephony card 304 via internet connection 306. As such, call generator 106 of system 400 may establish calls between telephony devices 102 and 104. The voice information associated with the calls is processed by IP telephony cards 302 and 304, and transmitted across internet connection 306.

Oscilloscope 110 displays the phase difference between a signal originating at telephony device 102, as sensed by probe 120 connected to monitoring device 212, and the signal as it arrives at telephony device 104, as sensed by probe 122 connected to monitoring device 214. Thus, latency in VoIP systems may be accurately measured. Because latency may increase as internet networks become increasingly large and complex, system 400 may have special applicability to local VoIP networks in which engineers have greater control over system constraints.

FIG. 5 is a high-level flow diagram of method 500 according to an embodiment of the present invention. In item 501, a call is established between a first telephony device and a second telephony device. In item 510, the telephony devices exchange signals. In item 520, the latency between a signal originating at the first telephony device and the signal as it arrives at the second telephony device is measured.

The foregoing description of the preferred embodiments is provided to enable any person skilled in the art to make or use the present invention. Various modifications to these embodiments are possible, and the generic principles presented herein may be applied to other embodiments as well. For example, multiple telephony devices and computers may be used, with routing between the telephony devices being prescribed by test engineers. Further, a monitoring device and call generator may be located outside of a computer if appropriate connection circuitry is provided. Additionally, the functionality of the telephony and monitoring devices may be incorporated into one device. In other embodiments, the telephony devices may be implemented as telephones instead of telephony cards.

While the invention has been described with reference to certain illustrated embodiments, the words which have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method of measuring latency in a VoIP (Voice over Internet Protocol) network, comprising:

establishing a call between a first telephony device and a second telephony device;

exchanging, over a VoIP network, one or more signals between the telephony devices;

measuring a baseline latency between at least one signal originating at the first telephony device and the signal as it arrives at the second telephony device, wherein the baseline latency is measured with a waveform analysis mechanism configured to monitor the at least one signal originating at the first telephony device and the signal as it arrives at the second telephony device, wherein the waveform analysis mechanism comprises an oscilloscope, the oscilloscope being a standalone device removably connected to the first telephony device and the second telephony device, the oscilloscope monitoring the signal originating at the first telephony device and the signal as it arrives at the second telephony device;

establishing at least one additional call;

measuring, with the oscilloscope, a second latency between a second signal originating at the first telephony device and the second signal as it arrives at the second telephony device when the at least one additional call is established; and comparing the baseline latency with the second latency.

2. The method according to claim 1, wherein the first telephony device is a telephony card.

3. The method according to claim 1, wherein the first telephony device is a telephone.

4. The method according to claim 1, further comprising establishing a plurality of additional calls, each of the additional calls being established between a pair of telephony devices.

5. The method according to claim 1, wherein the first and the second telephony devices are each coupled to a data bus in one computer.

6. The method according to claim 1, wherein the network includes an internet.

7. The method according to claim 1, wherein the network includes an ISDN network.

8. A system to measure latency in a VoIP (Voice over Internet Protocol) network, comprising:

a computer having a data bus;

a first and a second telephony device, the telephony devices being coupled to the data bus over a VoIP network and configured to transmit to each other and receive from each other signals;

a monitoring device coupled to the data bus and configured to monitor calls between the telephony devices;

an oscilloscope having a first and a second probe removably coupled to the monitoring device, the oscilloscope being a standalone device, the first probe being arranged to sense a signal originating at the first telephony device, the second probe being arranged to sense the signal as it arrives at the second telephony device, the oscilloscope displaying a phase difference between the originating and arriving signals, the phase difference representing a baseline latency; and a call generator coupled to the first and the second telephony devices, the call generator being configured to establish at least one call between the telephony devices, wherein the baseline latency is compared with a second latency measured by the oscilloscope, the second latency being measured when at least one additional call is established by the call generator, the second latency being between a second signal originating at the first telephony device and the second signal as it arrives at the second telephony device when the at least one additional call is established.

9. The system according to claim 8, wherein the telephony devices are analog telephony cards.

10. The system according to claim 8, wherein the telephony devices are digital telephony cards.

11. The system according to claim 8, further comprising a first and a second telephone, the first telephone being coupled to the monitoring device and being associated with the first telephony device, the second telephone being coupled to the monitoring device and being associated with the second telephony device.

12. The system according to claim 11, wherein a handset of either of the telephones is configured to be lifted to monitor the calls.

13. The system according to claim 8, wherein the call generator includes a bulk call generator program.

* * * * *